(12) United States Patent
Moon et al.

(10) Patent No.: US 7,227,890 B2
(45) Date of Patent: Jun. 5, 2007

(54) VDSL SYSTEM BASED ON DMT LINE CODING, AND METHOD FOR DETERMINING LENGTH OF CYCLIC PREFIX SAMPLES USING THE SYSTEM

(75) Inventors: Chan Moon, Seoul (KR); Hui-Chul Won, Busan (KR); Tae-Hyoung Kim, Kunpo (KR); Seung-Ho Choo, Seoul (KR); Gi-Hong Im, Pohang (KR)

(73) Assignees: Huconex Co., Ltd., Seoul (KR); Institute Information Technology Assessment, Daejeon (KR)

( * ) Notice: Subject to any disclaimer, the term of this patent is extended or adjusted under 35 U.S.C. 154(b) by 413 days.

(21) Appl. No.: 10/503,347

(22) PCT Filed: Apr. 30, 2002
(Under 37 CFR 1.47)

(86) PCT No.: PCT/KR02/00804

§ 371 (c)(1),
(2), (4) Date: Jul. 30, 2004

(87) PCT Pub. No.: WO03/065638

PCT Pub. Date: Aug. 7, 2003

(65) Prior Publication Data

US 2006/0050776 A1 Mar. 9, 2006

(30) Foreign Application Priority Data

Jan. 31, 2002 (KR) ................... 2002-5705

(51) Int. Cl.
*H04B 1/38* (2006.01)
(52) U.S. Cl. ..................................... 375/222
(58) Field of Classification Search ................ 375/222, 375/342–43, 260–61; 370/210, 480–85; 379/93.01
See application file for complete search history.

(56) References Cited

U.S. PATENT DOCUMENTS 5,838,720 A * 11/1998 Morelli ....................... 375/219
6,137,848 A 10/2000 Ho et al.

(Continued)

FOREIGN PATENT DOCUMENTS

WO 99/23764 A 5/1999

OTHER PUBLICATIONS

International Search Report for PCT/FR02/03291; ISA/EP; Mailed Mar. 6, 2003.

(Continued)

*Primary Examiner*—David C. Payne
*Assistant Examiner*—Leon Flores
(74) *Attorney, Agent, or Firm*—Harness, Dickey & Pierce, PLC (57) ABSTRACT

Disclosed is a VDSL (very high bit-rate digital subscriber line) system on the DMT line coding method basis and a method for determining a length of cyclic prefix samples using the system. The VDSL system comprises a transmitter data including cyclic prefix samples through a channel; a receiver for receiving the data including the cyclic prefix samples; a controller for controlling the transmitter and the receiver to control an initialization operation including handshake, training, channel analysis, and exchange, and a data transmission operation after the initialization operation; and a cyclic prefix sample length estimator for estimating an optimized length of the cyclic prefix sample on the basis of the correlation between the cyclic prefix sample and other data. According to the present invention, since no complex TEQ configuration required when fixing and using the length of the cyclic prefix sample is used, its configuration becomes simpler, and the optimized length of the cyclic prefix sample can be accurately determined.

12 Claims, 8 Drawing Sheets

U.S. PATENT DOCUMENTS 6,535,550 B1 * 3/2003 Cole .......................... 375/222
7,062,294 B1 * 6/2006 Rogard et al. ........... 455/562.1

OTHER PUBLICATIONS

Shi Wenziao, et al., "Removing distortion in DMT modulation caused by insufficient cyclic prefix length", Proceedings of the 3rd World Congress on Intelligent Control and Automation, 2000, Jun. 28-Jul. 2, 2000, vol. 4, pp. 2488-2491.

Bo Want, et al., "A frequency-domain eigenfilter approach for equalization in discrete multitone systems", Conference Record of the Thirty-Third Asilomar Conference on Signals, Systems, and Computers, 1999, Oct. 24-27, 1999, vol. 2, pp. 1058-1062.

Kok-Wui Cheong, et al, "Procoder for DMT with insufficient cyclic prefix", ICC 98. Jun. 7-11, 1998, vol. 1, pp. 339-343.

* cited by examiner

VDSL SYSTEM BASED ON DMT LINE CODING, AND METHOD FOR DETERMINING LENGTH OF CYCLIC PREFIX SAMPLES USING THE SYSTEM

CROSS REFERENCE TO RELATED APPLICATION

This application is based on Korea Patent Application No. 2002-5705 filed on Jan. 31, 2002 in the Korean Intellectual Property Office, the content of which is incorporated herein by reference.

BACKGROUND OF THE INVENTION (a) Field of the Invention

The present invention relates to a VDSL (Very high bit-rate Digital Subscriber Line) system on the basis of a DMT multi-carrier (Discrete MultiTone) line coding method. More specifically, the present invention relates to a VDSL system based on the DMT line coding method using an optimally estimated length of a CP (Cyclic Prefix) sample, and a method for determining the length of the CP sample in the same system.

(b) Description of the Related Art

The VDSL represents a technique for sending high-speed data of 10 through 50 Mbps through a telephone line over a distance (300 through 500 m) that is shorter than that of the ADSL (Asymmetric Digital Subscriber Line). The VDSL is standardized by American T1E1.4, and classified as the CAP (Carrierless Amplitude and Phase modulation) and the DMT line coding methods, and the present invention relates to a VDSL system of the DMT method.

The DMT line coding method divides a total transmission tone into a plurality of tones, and determines formats of transmission signals according to channel environments of the respective tones. In this DMT line coding method, inter-symbol interference generated through channels substantially deteriorates the performance of the whole system. To prevent the influence of the inter-symbol interferences, CPs (cyclic prefixes) are employed.

Usage of the CP samples is to previously repeat and send part of the transmission signals, and accordingly, the transmission signals come to have cyclic features. Deterioration of performance caused by the inter-symbol interference can be prevented when the length of the CP samples is sufficiently long.

Figure 1:
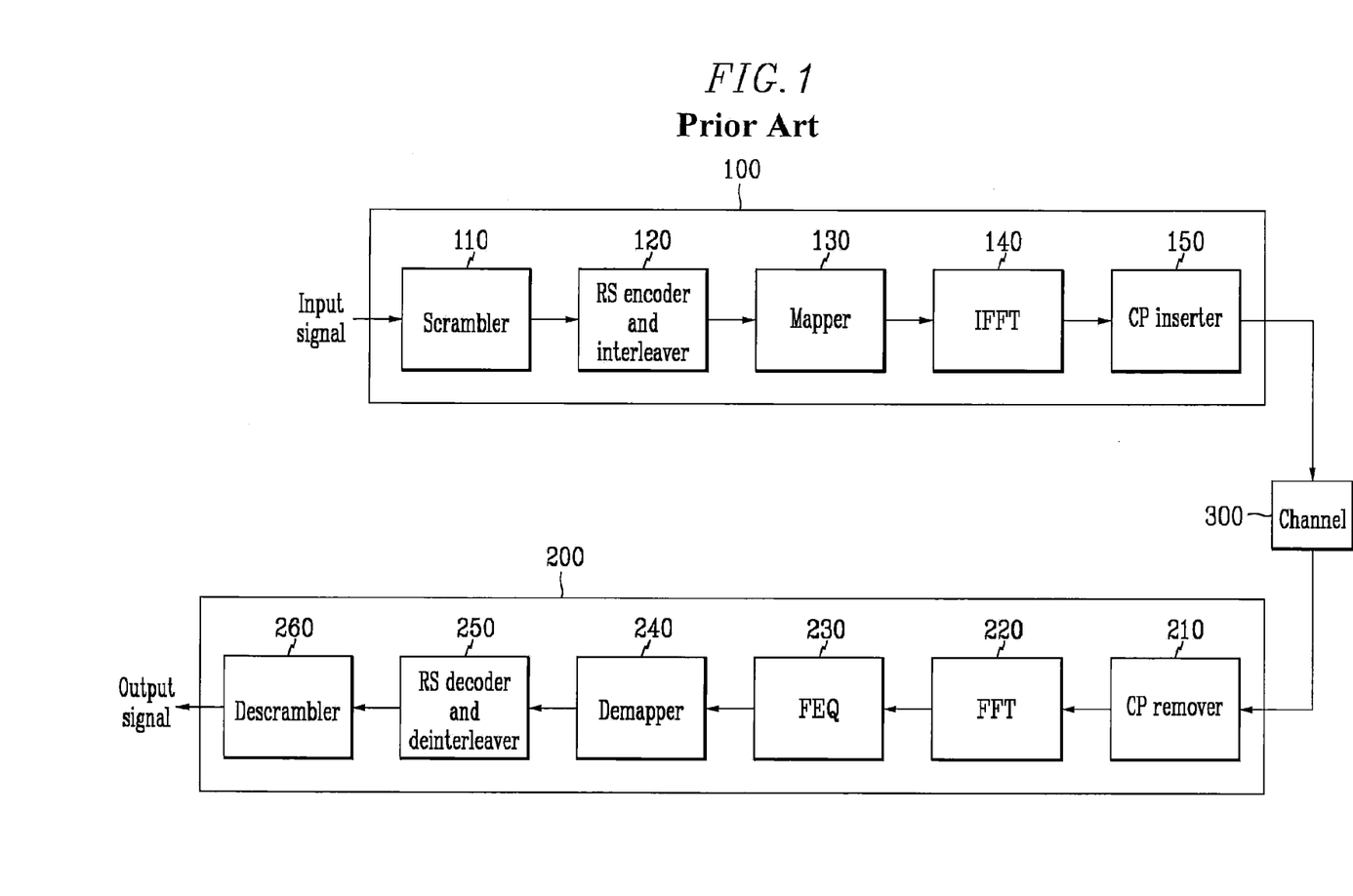
FIG. 1 shows a block diagram of a DMT VDSL system applying general DMT line coding thereto.

FIG. 1 shows a block diagram of a DMT VDSL system applying general DMT line coding thereto.

As shown, the DMT VDSL system comprises a transmitter 100 and a receiver 200.

A scrambler 110 scrambles the signals input to the transmitter 100, an RS (Reed-Solomon) encoder 120 encodes the signals into RS codes which include a slow channel that passes through an interleaver 120 and a fast channel that does not pass through the interleaver 120, and a mapper 130 maps them according to a number of bits allocated to each tone by using the QAM (Quadrature Amplitude Modulation) method.

An IFFT 140 converts the frequency band samples mapped to the respective tones into time band samples, and a CP inserter 150 inserts a CP sample to each time band sample so as to remove the influence of the inter-symbol interference caused by the channel, and outputs them as transmission signals.

The transmission signals into which the CP is inserted and which are output by the transmitter 100 are provided to the receiver 200 through a channel 300.

In the receiver 200, a CP remover 210 removes the CP inserted into the transmission signals received through the channel 300, and outputs clean transmission signals, and an FFT 220 converts them into frequency band signals. An FEQ (Frequency domain EQualizer) 230 compensates for channel attenuation, and a demapper 240 demaps the signals output by the FEQ 230, and outputs result signals, and the result signals are recovered to original signals and are then output by an RS decoder and deinterleaver 250 and a descrambler 260.

FIG. 2 shows CP samples applied to the general DMT line coding method.

Figure 2A:
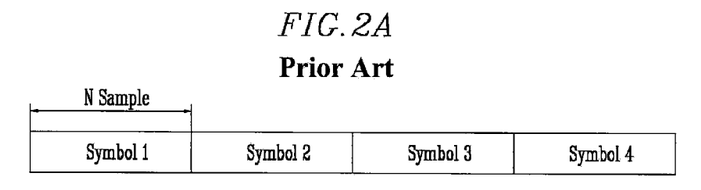
FIG. 2 shows CP samples applied to the general DMT line coding method.

FIG. 2(a) shows a format of the transmission signal applying no CP sample thereto. In the case of transmitting the transmission signal through the channel 300, a severe lowering of performance may be generated because of the inter-symbol interference caused by the channel 300.

Figure 2B:
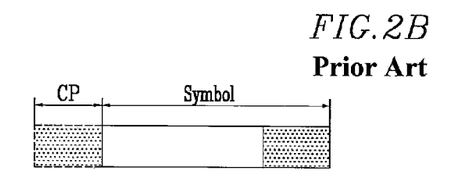

FIG. 2(b) shows a process for generating a CP sample. The CP is used for reproducing part of the samples of the transmission signals (symbols), in particular the last part, and transmitting the same in advance, and the CP enables the transmission signals to have a cycle.

Figure 2C:
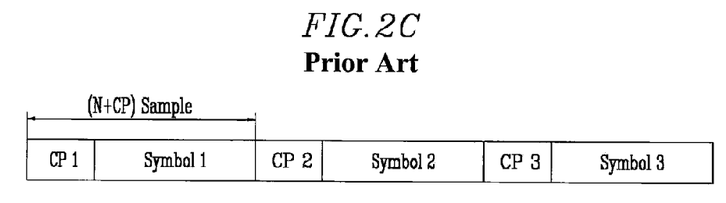

FIG. 2(c) shows a format of the transmission signal after application of the CP sample through the process of FIG. 2(b). In this instance, a sample number of the transmission signals increases to N+Ncp by adding a sample number Ncp of the CPs to the sample number N which is a sample number of a single symbol.

Figure 2D:
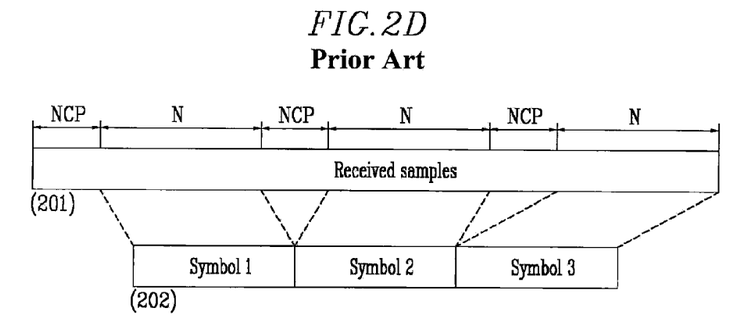

FIG. 2(d) shows a process for removing CP samples from received sample signals, and extracting original transmission signals. Through this process, clean original transmission signals from which the inter-symbol interferences caused by the channel 300 are removed, are extracted.

The above-noted usage of the CP samples has been widely used in the DMT line coding. For example, U.S. Pat. No. 5,285,474 discloses a method for using CP samples with fixed lengths, and utilizing a complex TEQ (Time domain EQualizer) technique to control the influence of the inter-symbol interference caused by a channel.

Differing from the DMT ADSL system that use the complex TEQ technique because of a very long channel, the VDSL system can obtain sufficient capability not by using the TEQ technique but by using CP samples with appropriate lengths, and hence, it is very important to effectively measure the length of the CP samples and apply it.

That is, as shown in FIG. 2, transmission efficiency is greatly reduced when maximally fixing the length of the CP samples and repeatedly sending the original transmission signals.

SUMMARY OF THE INVENTION

It is an advantage of the present invention to provide a VDSL system on the basis of the DMT line coding method for estimating an optimal length of CP samples using transmission signals and correlation status of the CP samples, and a method for determining a length of the CP samples in the VDSL system.

In one aspect of the present invention, a VDSL system on the basis of the DMT line coding method, the VDSL system including a transmitter for transmitting data including a CP sample through a channel, and a receiver for receiving the data including the CP sample through the channel, comprises: a controller for controlling the transmitter and the receiver to control initial operations including a handshake operation, a training operation, and a channel analysis and exchange operation, and a data transmission operation after the initial operations; and a CP sample length estimator for estimating an optimized length of the CP sample on the basis of the correlation status between the CP sample included in the data received through the channel and residual data.

In another aspect of the present invention, in a VDSL system on the basis of the DMT line coding method, the VDSL system including a transmitter for transmitting data including a CP sample through a channel; a receiver for receiving the data including the CP sample through the channel; a controller for controlling the transmitter and the receiver to control initial operations and a data transmission operation; and a CP sample length estimator for estimating an optimized length of the CP sample on the basis of the correlation status of the data received through the channel, a method for determining a CP sample length in the VDSL system on the DMT line coding method basis comprises: (a) the controller transmitting the maximum length of the CP sample through the transmitter; (b) the CP sample length estimator receiving data including the CP of the transmitted maximum length through the receiver; (c) the CP sample length estimator estimating the optimized length of the CP sample on the basis of a correlation status between the CP sample included in the received data and residual data, and transmitting the estimated optimized length to the controller; and (d) the controller transmitting the estimated optimized length of the CP sample through the transmitter.

The step (c) comprises: (i) selecting a predetermined number of first samples from among the CP sample included in the received data; (ii) calculating correlation statuses between the first samples stored in (i) and second samples matched with the predetermined number of first samples from among residual data from which the CP sample is excluded; (iii) moving the first samples by a predetermined move quantity, storing them, repeating (ii), and calculating the correlation statuses of the second samples moved by the predetermined move quantity; (iv) determining whether the correlation statuses calculated in (ii) and (iii) are matched with a predetermined threshold value; and. (v) estimating the addition of the move quantity matched with the predetermined correlation status and the predetermined number as the optimized length of the CP sample, when the predetermined correlation status is matched with the predetermined threshold value in (iv).

The step (c) comprises: (i) storing the CP samples included in the received data; (ii) repeating a calculating operation of the correlation status between a predetermined number of first samples from among the stored CP sample and second samples matched with the first samples from among residual data from which the CP sample is excluded by moving the first and second samples by a predetermined move quantity, and concurrently calculating the correlation status on a portion where the first and second samples are superimposed through a pipeline operation in each repetition step, the portion being moved by the move quantity; (iii) determining whether the correlation statuses respectively calculated in (ii) are matched with a predetermined threshold value; and (iv) estimating the addition of the move quantity matched with the predetermined correlation status and the predetermined number as the optimized length of the CP sample, when the predetermined correlation status is matched with the predetermined threshold value in (iii).

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 5 shows an operation concept of the CP sample length estimator of FIG. 4, wherein FIG. 5($a$) shows a symbol to which a CP with a maximum length established in the handshake process is applied, and FIG. 5($b$) shows a process for moving a predetermined number of samples and measuring a code correlation status;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

FIG. 3 shows exemplified cases for applying a DMT VDSL system thereto according to a preferred embodiment of the present invention.

Figure 3A:
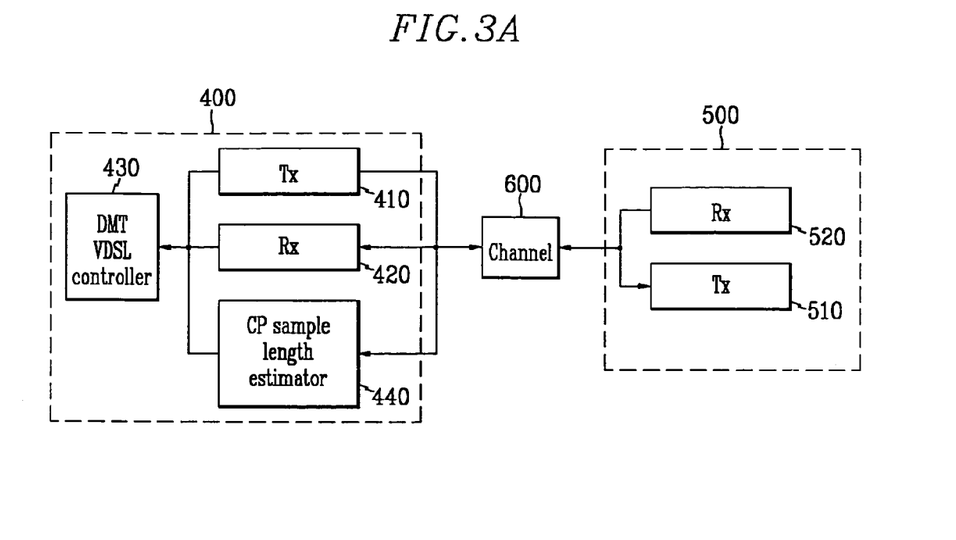
FIG. 3 shows an exemplified case for applying a DMT VDSL system thereto according to a preferred embodiment of the present invention.

Referring to FIG. 3($a$), a communication service provider 400 and a user 500 are connected through a channel 600, and the communication service provider 400 and the user 500 respectively comprise a transmitter 410 and 510 and a receiver 420 and 520.

The communication service provider 400 further comprises: a DMT VDSL controller 430 for controlling the transmitter 410 and the receiver 420 to control initial operations including a handshake operation, a training operation, and a channel analysis and exchange operation, and a data transmission operation after the initial operation; and a CP (cyclic prefix) sample length estimator 440 for using a signal transmitted from the user's transmitter 510 to estimate and determine an optimized length of the CP sample in the initial process. In this instance, the CP sample length estimator 440 is provided as an additional block, but the same may be included in the receiver 420 of the communication service provider to be processed as a single block.

The transmitter 410 of the communication service provider 400 transmits a downlink signal to the receiver 520 of the user 500 through the channel 600, and the user's transmitter 510 transmits an uplink signal to the receiver 420 of the communication service provider 400 through the channel 600.

Figure 3B:
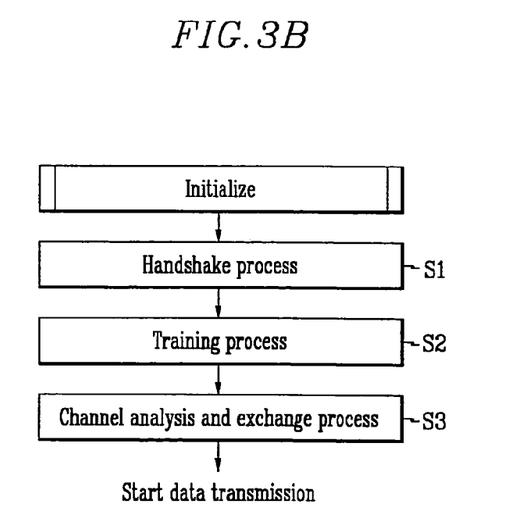

FIG. 3(b) shows a flowchart of an initialization process executed by the communication service provider 400.

The initialization process matches default conditions for communication between the communication service provider 400 and the user 500, it follows the initialization process specified by part 3 of the T1E1.4 VDSL standard except the training process that will be subsequently described, and it is controlled by the DMT VDSL controller 430.

In the initialization process, a handshake process is executed in step S1 to start communication.

In the handshake process in step S1, the communication service provider 400 communicates with the user 500 using the simplest DPSK (Differentially encoded binary Phase Shift Keying) to share information including provider identification, an FFT size, and an initial length (the maximum length) of a CP sample.

After the handshake process, the training process is executed in step S2 using the DMT line coding method.

In the training process in step S2, the receiver 420 of the communication service provider receives symbol data with the initial length of the CP sample from the user's transmitter 510 to determine the optimized length of the CP that satisfies the channel 600 environment.

In addition, the communication service provider 400 and the user 500 may be respectively synchronized according to a predetermined order, and they may converge an equalizer to establish a basis for correctly reading transmission signals.

Finally, in the channel analysis and exchange process in step S3, they transmit and receive various kinds of communication information including a transmission data rate and parameters of the RS code with each other to thereby start normal communication.

Figure 3C:
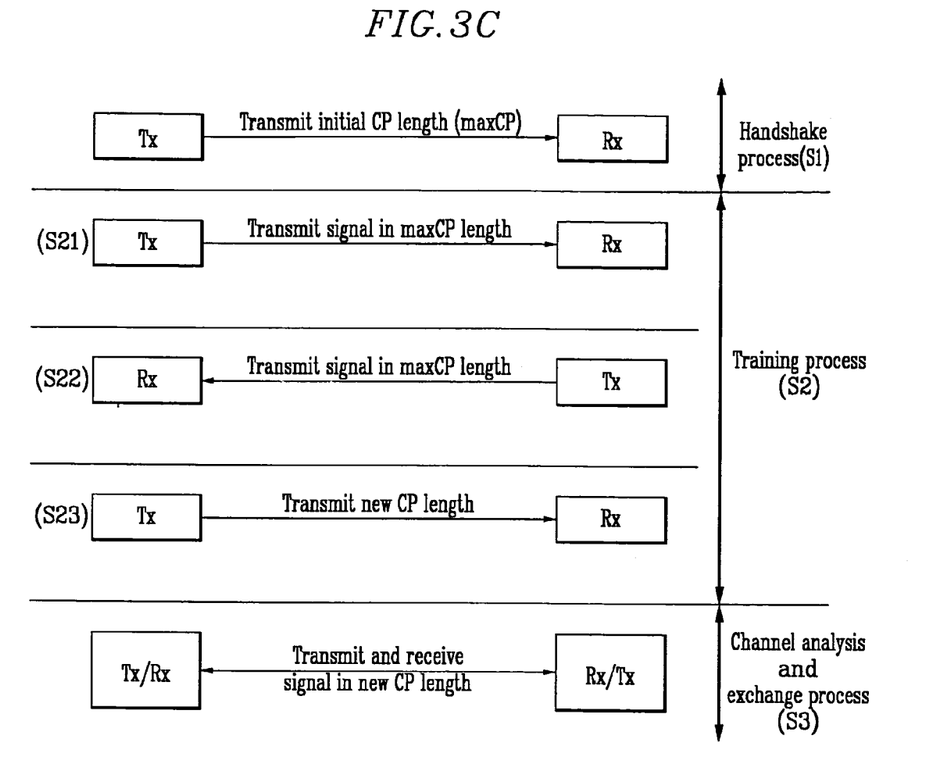

FIG. 3(c) shows a detailed flowchart of the initialization process shown in FIG. 3(b).

As shown, in the handshake process in step S1, the transmitter 410 of the communication service provider transmits the initial length of the CP sample (maxCP) set as a maximum value, to the user's receiver 520.

Next, in the training process in step S2, a CP sample with the maximum length is generated, and the communication service provider 400 and the user 500 respectively transmits signals.

That is, the transmitter 410 of the communication service provider applies the CP sample with the maximum length to a symbol signal, and transmits the signal to the user's receiver 520 in step S21, and the user's transmitter 510 applies the CP sample with the maximum length to the symbol signal, and transmits the signal to the receiver 420 of the communication service provider in step S22.

When receiving the symbol signal to which the CP sample with the maximum length is applied from the user's transmitter, the CP sample length estimator 440 measures a code correlation status of a portion of samples of the CPs and samples matched with symbol data to determine the length of the CP sample satisfying the channel 600 environment, and transmits the determined length of the CP sample, that is, a new length of the CP sample to the user's receiver 520 through the transmitter 410 of the communication service provider in step S23.

After this, in the channel analysis and exchange process in step S3 or in a data transmission process, the signals are transmitted using the newly determined length of the CP sample.

Figure 4:
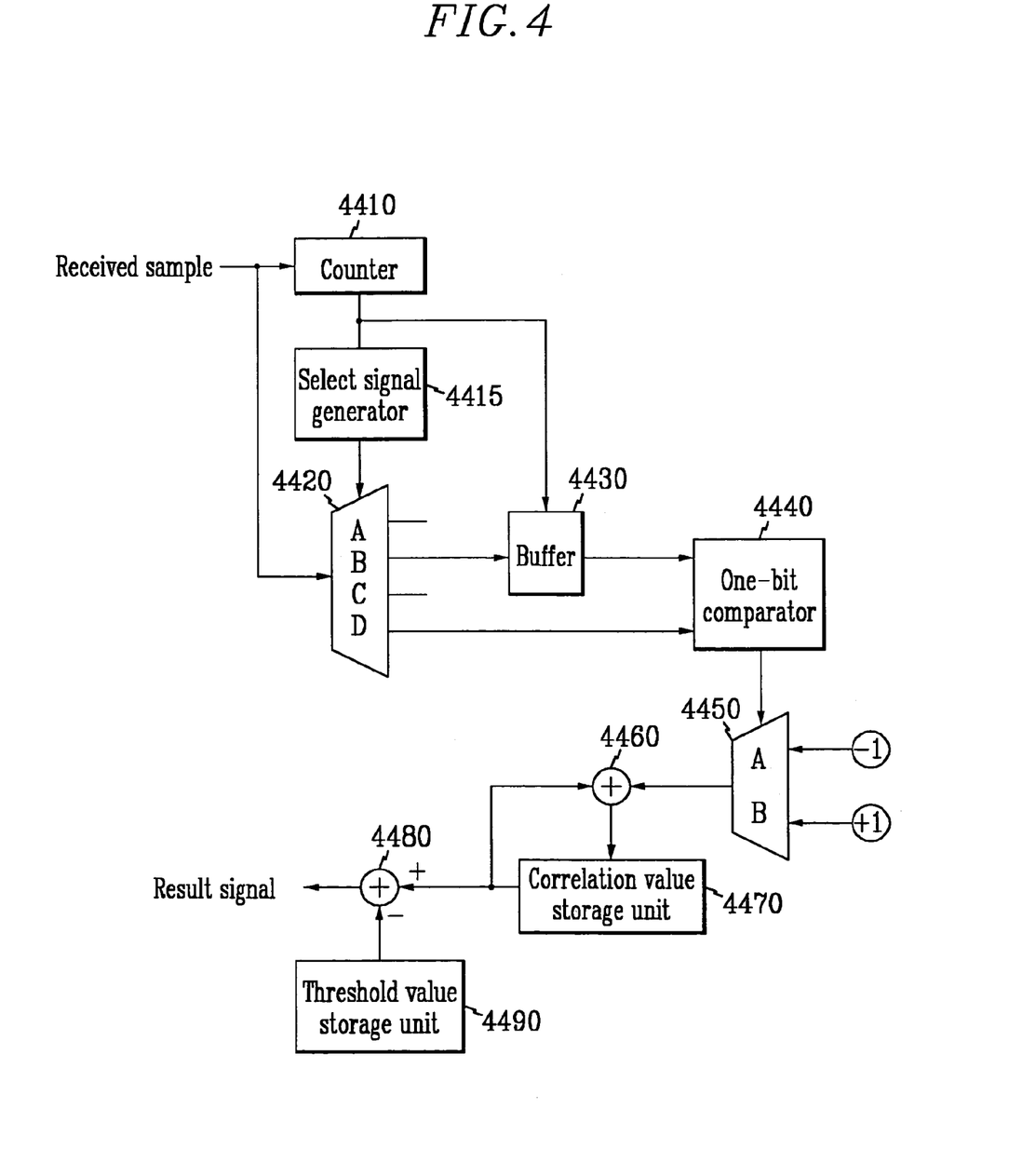
FIG. 4 shows a detailed block diagram of a CP sample length estimator shown in FIG. 3($a$)
Figure 5A:
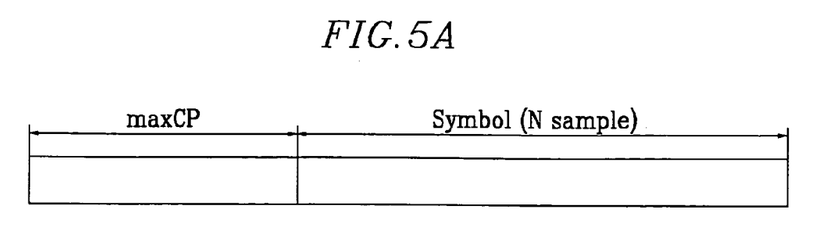
Figure 5B:
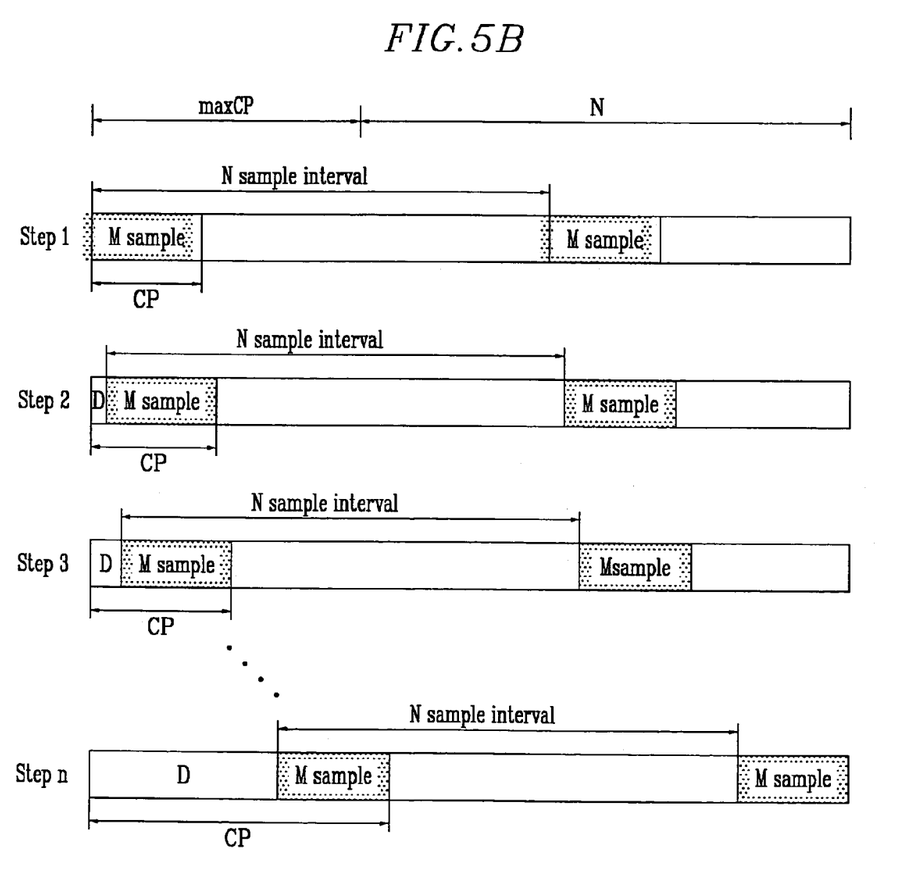

FIG. 4 shows a detailed block diagram of the CP sample length estimator 440 shown in FIG. 3(a), and FIG. 5 shows its operation, FIG. 5(a) showing a symbol (the size of the symbol is N) to which a CP with a maximum length (maxCP) established in the handshake process, and FIG. 5(b) showing a process for moving a predetermined number of samples and measuring a code correlation status.

As shown in FIG. 4, the CP sample length estimator 440 comprises a counter 4410, a select signal generator 4415, multiplexers 4420 and 4450, a buffer 4430, a one bit comparator 4440, adders 4460 and 4480, a correlation value storage unit 4470, and a threshold value storage unit 4490.

On receiving a receipt sample, the counter 4410 starts counting from 0, and increases the counting by 1 up to the maximum length (maxCP) of the CP transmitted in the handshake process (S1) and the length N of the transmitted symbol. That is, the counting values of the counter 4410 range from 0 to maxCP+N−1.

The select signal generator 4415 generates a select signal used by the multiplexer 4420 according to the counting values of the counter 4410.

The multiplexer 4420 outputs one MSB data of the receipt sample through an output port selected according to a select signal output by the select signal generator 4415.

Referring to FIG. 5(b), the MSBs of the samples that belong to the CP from among the receipt samples are output through an output port B of the multiplexer 4420, and the MSbs of the samples that belong to the symbol are output through an output port D of the multiplexer 4420.

The buffer 4430 stores MSB data output from the output port B of the multiplexer 4420. In this instance, their storage position is determined according to the counting value of the counter 4410.

The one bit comparator 4440 compares the MSB output from the buffer 4430 with the MSB data output from the output port D of the multiplexer 4420, and outputs a comparison result as a select signal of the multiplexer 4450.

The multiplexer 4450 outputs a value selected according to the output signal of the one bit comparator 4440. When the two MSB data input to the one bit comparator 4440 are identical, the one bit comparator 4440 outputs '1,' and the multiplexer 4450 selects '+1' data because of the output of '1,' and outputs the same. When the two MSBs input to the one bit comparator 4440 are different, the one bit comparator 4440 outputs '0,' and the multiplexer 4450 selects '−1' data because of the output of '0,' and outputs the same. In this instance, the reason why the data output from the multiplexer 4450 is '−1' when the two MSBs are different is to makes the code correlation status be more clearly known, and accordingly, it is also acceptable to use '0' instead of '−1' or other numbers that generate the same effect.

The adder 4460 adds the data output from the multiplexer 4450, that is, '+1' or '−1' to the correlation value stored in the correlation value storage unit 4470, and stores the added result in the correlation value storage unit 4470.

When the addition of the correlation values with respect to the M samples illustrated in FIG. 5(b) is finished, the adder 4480 compares the correlation values with the threshold value previously stored in the threshold value storage unit 4490, and outputs a result signal.

An addition D+M of a move quantity D of the sample and a number value M of the samples when the final correlation value becomes identical with the threshold value is determined as the estimated length of the CP.

Figure 6:
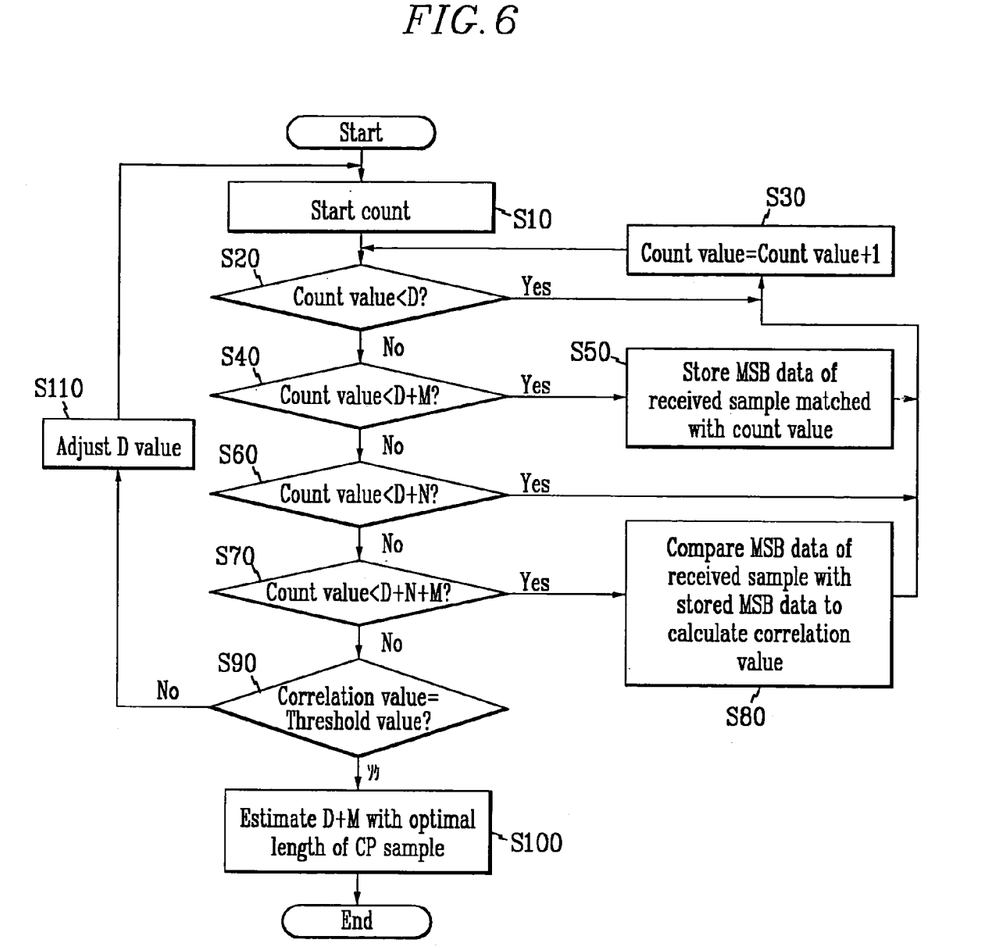
FIG. 6 shows a flowchart of a method for estimating a length of the CP sample in the DMT VDSL system according to a preferred embodiment of the present invention.

Referring to FIG. 6, a method for estimating the length of the CP sample according to the preferred embodiment of the present invention will now be described.

First, when the DMT VDSL controller 430 executes the handshake process S1 so that the length of the CP sample, that is, the maximum length (maxCP) is given to the user 500, the user's transmitter 510 transmits a symbol sample attaching a CP with the maximum length shown in FIG. 5(*a*) thereto to the CP sample length estimator 440, and when the CP sample length estimator 440 receives the sample, the counter 4410 starts counting from 0 in step S10.

The operation state in this case becomes a state without move quantity D of the M sample as shown in the first step of FIG. 5(*b*).

When the counter 4410 starts counting, the select signal generator 4415 determines a corresponding select signal according to its counting value, and outputs the select signal to the multiplexer 4420.

In this instance, under the state without move quantity D of the M samples, the select signal depending on the counting value is determined as follows:

1) a select signal of the output port B of the multiplexer 4420 when the counting value ranges from 0 to M−1 (that is, the counting value is provided within the M samples of the CP), 2) a select signal of the output port C of the multiplexer 4420 when the counting value ranges from M to N−1 (that is, the counting value is passed through the M samples of the CP and provided before the M samples of the symbol), and 3) a select signal of the output port D of the multiplexer 4420 when the counting value ranges from N to M+N−1 (that is, the counting value is provided within the M samples of the symbol).

As shown in the second through n steps of FIG. 5(*b*), the select signal depending on the counting value with move quantity D of the M samples is determined as follows.

1) a select signal of the output port A of the multiplexer 4420 when the counting value ranges from 0 to D−1 (that is, the counting value is provided before the M samples of the CP), 2) a select signal of the output port B of the multiplexer 4420 when the counting value ranges from D to D+M−1 (that is, the counting value is provided within the M samples of the CP), 3) a select signal of the output port C of the multiplexer 4420 when the counting value ranges from D+M to D+N−1 (that is, the counting value is passed through the M samples of the CP and provided before the M samples of the symbol), and 4) a select signal of the output port D of the multiplexer 4420 when the counting value ranges from D+N to D+M+N−1 (that is, the counting value is provided within the M samples of the symbol).

Hence, the CP sample length estimator 440 determines whether the counting value of the counter 4410 is less than the move quantity D of the previous M samples in step S20. That is, it determines whether the counting value is provided before the M samples provided within the CP sample, because the sample corresponding to the counting value must be neglected when the counting value is provided before the M samples provided within the CP sample.

Therefore, when the counting value is less than the move quantity D of the M samples in the determination step S20, the multiplexer 4420 outputs no data. In this case, the select signal generator 4415 outputs a select signal for selecting the output port A of the multiplexer 4420, and the multiplexer 4420 outputs MSB data of the received sample to the output port A of the multiplexer 4420, but no operation occurs because the output data of the output port A are not used.

However, when the move quantity D is 0, the counting value is equal to or greater than the move quantity D, and accordingly, this step is satisfied and passed.

When the counting value is less than the move quantity D in the previous step S20, the counting value is increased by 1 in step S30, and the determination step S20 and the increase step S30 are repeatedly performed until the counting value becomes identical with or greater than the move quantity D.

Next, when the counting value is equal to or greater than the move quantity D, the CP sample length estimator 440 determines whether the counting value is less than the addition D+M of the move quantity D and the length of the M samples in step S40. That is, it determines whether the counting value is provided within the M samples of the CP sample, because it is required to store the MSB of the sample corresponding to the counting value in the corresponding position of the buffer 4430 when the counting value is positioned within the M samples of the CP sample, in step S50.

Therefore, when the counting value is less than D+M, the MSB data of the received sample is stored in the buffer 4430, and its corresponding detailed description will now be provided.

Since the counting value is provided between D and D+M−1, the select signal generator 4415 outputs a select signal for selecting the output port B of the multiplexer 4420, and the multiplexer 4420 outputs the MSB data of the received sample matched with the corresponding counting value to the buffer 4430 through the output port B according to the output signal.

The buffer 4430 stores the MSB data output from the multiplexer 4420 in the position from which the move quantity D is subtracted, that is, the position of (the counting value−D).

After this, the counting value is increased by 1 in step S30, and the steps S10, S20, S40, S50, and S30 are repeated until the counting value becomes identical with or greater than D+M. As a result, the steps are repeated until the MSB data of each M samples provided in the CP sample is stored in the buffer 4430.

Next, it is determined whether the counting value is less than the addition D+N of the move quantity D and the symbol size N in step S60. That is, it is determined whether the counting value is passed through the M samples provided within the CP sample and positioned before the M samples positioned in the symbol. In this case, no operation is performed in the like manner of the previous step S20, and the step S30 for increasing the next counting value is performed. The select signal generator 4415 outputs a signal for selecting the output port C of the multiplexer 4420, and output data of the output port C are not used.

Next, when the counting value is equal to or greater than D+N, it is determined whether the counting value is less than the added value D+N+M of the move quantity D, the length M of the M samples, and the length N of the symbol in step S70. That is, it is determined whether the counting value is provided within the M samples provided within the symbol, because it is required to find a correlation result value of the MSB of the sample matched with the counting value and the MSB stored in the corresponding position of the buffer 4430, and store the correlation result value when the counting value is provided within the M samples within the symbol, in step S80.

Therefore, when the counting value is greater than D+N and less than D+N+M, the MSB data of the received sample, matched with the counting value is to be compared to the MSB data matched with the buffer 4430, which will now be described.

Since the counting value is provided between D+N and D+N+M−1, the select signal generator 4415 outputs a select signal for selecting the output port D of the multiplexer 4420, and the multiplexer 4420 outputs the MSB data of the received sample matched with the corresponding counting value to the one bit comparator 4440 through the output port D according to the output signal.

The buffer 4430 outputs the MSB data stored in the position matched with the received sample output through the output port D of the multiplexer 4420, that is, the M samples to the one bit comparator 4440. In this instance, the corresponding position of the buffer 4430 can be found from (the counting value—the move quantity D—the symbol size N). That is, the MSB data stored in the position of (the counting value—D−N) is output to the one bit comparator 4440.

After this, the one bit comparator 4440 compares the MSB data respectively input from the multiplexer 4420 and the buffer 4430 to output a comparison result value. That is, the one bit comparator 4440 outputs '1' when the respective MSB data are not distorted by the channel 600 and are uniformly maintained, and it outputs '0' in other cases. An output value of the multiplexer 4450 is selected according to the above-noted output values.

The multiplexer 4450 outputs signals by using the result values of the one bit comparator 4440 as select signals. The multiplexer outputs '+1' when the respective MSB data are the same and a comparison result value is '1,' and outputs '−1' when the MSB data are distorted and become different and the comparison result value is '0.'

The adder 4460 adds the '+1' or '−1' output by the multiplexer 4450 and stores an added value in the correlation value storage unit 4470.

After this, the counting value is increased by 1 in step S30, and the steps S10, S20, S40, S60, S70, S80, and S30 are repeated until the counting value reaches D+N+M.

Accordingly, the steps are repeated until the respective MSB data of the M samples positioned in the symbol are compared with the MSB data stored to be matched with the buffer 4430 to add corresponding correlation values and output the same. Therefore, the correlation value stored in the correlation value storage unit 4470 when the counting value reaches D+N+M becomes a correlation degree for showing the distortion status of the received symbol in the corresponding step.

Next, since the comparison of the M samples has been completed when the counting value becomes D+N+M, that is, when the counting value digresses from the M samples within the symbol, it is then determined that the correlation value calculated, from the previous step S80 is matched with the threshold value previously obtained from a test and stored in the threshold value storage unit 4490 in step S90.

When the calculated correlation value and the threshold value are the same in step S90, the move quantity D and the length of the M samples, that is, D+M is estimated to be an optimized length of the CP sample in step S100.

If they are not the same in step S90, the move quantity D is controlled to have a different value in step S110, that is, it is adjusted to become larger, and the above steps S10 through S90 are repeated.

When the optimized length of the CP is estimated through the steps 1 through n as shown in FIG. 5(*b*), the DMT VDSL controller 430 of the communication service provider 400 transmits the estimated optimized length of the CP to the user 500 through the transmitter 410, and after this, the communication service provider 400 and the user 500 performs data communication by transmitting the CP-attached symbols according to the estimated optimized length of the CP, thereby maximally reducing the inter-symbol interferences caused by the channel 600 environment and increasing the transmission efficiency.

In more detail referring to FIG. 5(*b*), in the first step, MSB data between M samples within a CP sample and M samples after N samples representing a symbol size, that is, correlation statuses of codes are measured, and corresponding results are, stored. In this instance, N indicates twice the total band number of the DMT VDSL system, that is, one of 512, 1024, 2048, 4096, and 8192, specified in the T1E1.4 VDSL standard. Also, the value M is a number of samples used for measuring code correlation statuses, and it is experimentally appropriate to set the number M as 100 when the number N is 8192.

In the second step, results obtained by measuring code correlation statuses between the M samples after the D samples from the first sample and the M samples after the (D+N) samples are also stored so as to move positions of the M samples by D samples. In this instance, the value D for moving the positions of the M samples for the respective steps is less than the value N. For example, it is appropriate that D=20 when M=100, and it can be understood that the value D ranges from 1 to maxCP, according to the technical, scope of the present invention.

In the third step, the value D is doubled to repeat the second step. The value D is continuously increased twice to measure the code correlation status between the M samples and store the same, and when the value D+M becomes identical with the length of the maxCP, the step is terminated.

When the threshold value which is preset from among the code correlation degree values stored in the above steps is set to be 96 when M=100, a code correlation degree value identical with the corresponding threshold value is found, and the value (D+M) in this case is the optimized length of the CP sample.

When there are at least two cases identical with the threshold value, a median value or a mean value from the respective values of (D+M) can be selected as the optimized length of the CP sample.

In the above, the M samples provided within the CP sample from among the received samples are stored in the buffer 4430, and when the M samples provided within the symbol are counted, the code correlation value between the MSB data of the counted sample and the MSB data of the sample stored in the buffer 4430 is found. In the further case of finding the code correlation degree through the pipeline method shown in FIG. 7, when the samples are received as shown in FIGS. 4, 5, and 6, a counter for counting from 0 to maxCP is operated to store the total CP samples including the M samples in a predetermined buffer by performing counting.

Figure 7:
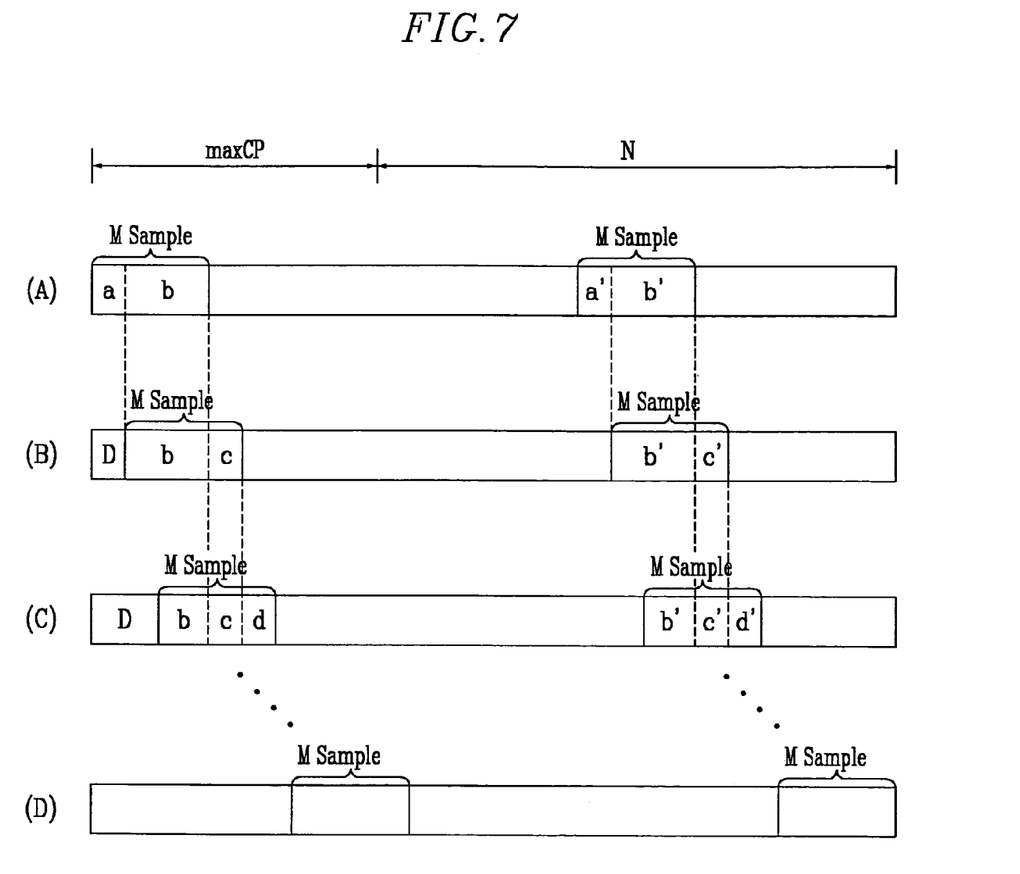
FIG. 7 shows a method for estimating a length of the CP sample according to a pipeline method in the DMT VDSL system according to another preferred embodiment of the present invention.

After this, when the counting value reaches the M samples within the symbol while continuously increasing the counting value, the MSB data of the portion a' shown in FIG. 7(*a*) is compared with the MSB data of the portion a to calculate the corresponding correlation value and store it. The operation hereto is similar to the preferred embodiment of FIGS. 4, 5, and 6, but when the counting value reaches b' of the M samples, the MSB data of the portion b' is compared with the MSB data of portion b, and since this portion is concurrently included in the M samples of FIG. 7(*b*) moved by D samples from the M samples of FIG. 7(*a*), the calculation of the correlation value with the portion b with respect to the portion b' must be concurrently executed at the M samples of FIG. 7(*a*) and the M samples of FIG. 7(*b*).

In the like manner, when the counting value increases to be provided at the portion c' of the M samples of FIG. 7(b), since the portion c' is concurrently included in the M samples of FIG. 7(c), the correlation values of the MSB data of the portion c' and the MSB data of the portion c with respect to the M samples of FIG. 7(b) and the M samples of FIG. 7(c) must be concurrently calculated and stored. This operation is continuously and uniformly performed until the M samples become the end portion of the CP sample.

Accordingly, not by sequentially operating the respective steps as shown in the preferred embodiment of FIGS. 4, 5, and 6, but by concurrently operating all the steps in the pipeline manner, the size of the predetermined buffer for storing the Cp sample with the maximum length increases in the early stage, but the total time for estimating the optimized length of the CP sample is very much reduced.

According to the present invention, since the case of fixing the length of the CP sample and using the same uses no complex TEQ structure, its structure becomes simpler, and the optimized length of the CP sample can be accurately determined through the simpler structure.

Also, since the optimized length of the CP sample following various channel environments can be found, the transmission rate can be optimized.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A VDSL (Very high bit-rate Digital Subscriber Line) system on the basis of the DMT (Discrete MultiTone) line coding method, the VDSL system including a transmitter for transmitting data including a CP (cyclic prefix) sample through a channel, and a receiver for receiving the data including the CP sample through the channel, comprising:
   a controller for controlling the transmitter and the receiver to control initial operations including a handshake operation, a training operation, and a channel analysis and exchange operation, and a data transmission operation after the initial operations;
   a CP sample length estimator for estimating an optimized length of the CP sample on the basis of the correlation status between the CP sample included in the data received through the channel and symbol;
   a counter for starting counting when receiving data through the channel;
   a first multiplexer for selectively outputting each MSB (Most Significant Bit) of the data received through the channel according to counting values of the counter;
   a buffer for storing the data output from the first multiplexer in positions matched with the counting values of the counter;
   a bit comparator for comparing correlation statuses of the data output from the first multiplexer and the data stored in the buffer, and outputting result values;
   a correlation value storage unit for adding the correlation status result values output from the bit comparator, and storing results; and
   a comparator comparing a correlation value stored in the correlation value storage unit with a predetermined threshold value, and outputting result values.

2. The VDSL system of claim 1, further comprising a select signal generator for generating a select signal for selectively controlling outputs of the first multiplexer according to the counting values of the counter.

3. The VDSL system of claim 1, wherein the correlation value storage unit adds +1 when the respective MSB data of the data output from the first multiplexer and the data stored in the buffer are the same, and adds −1 when the respective MSB data are different, to thereby calculate the correlation value.

4. In a VDSL (Very high bit-rate Digital Subscriber Line) system on the basis of the DMT (Discrete MultiTone) line coding method, the VDSL system including a transmitter for transmitting data including a CP (cyclic prefix) sample through a channel; a receiver for receiving the data including the CP sample through the channel; a controller for controlling the transmitter and the receiver to control initial operations and a data transmission operation; and a CP sample length estimator for estimating an optimized length of the CP sample on the basis of the correlation status of the data received through the channel, a method for determining a CP sample length in the VDSL system on the DMT line coding method basis comprising:
   (a) the controller transmitting the maximum length of the CP sample through the transmitter;
   (b) the CP sample length estimator receiving data including the CP of the transmitted maximum length through the receiver;
   (c) the CP sample length estimator estimating the optimized length of the CP sample on the basis of a correlation status between the CP sample included in the received data and symbol, and transmitting the estimated optimized length to the controller; wherein (c) comprises:
      (i) selecting a predetermined number of first samples from among the CP sample included in the received data;
      (ii) calculating correlation statuses between the first samples stored in (i) and second samples matched with the predetermined number of first samples from among data from which the CP sample is excluded;
      (iii) moving the first samples by a predetermined move quantity, storing them, repeating (ii), and calculating the correlation statuses of the second samples moved by the predetermined move quantity;
      (iv) determining whether the correlation statuses calculated in (ii) and (iii) are matched with a predetermined threshold value; and
      (v) estimating the addition of the move quantity matched with the predetermined correlation status and the predetermined number as the optimized length of the CP sample, when the predetermined correlation status is matched with the predetermined threshold value in (iv); and
   (d) the controller transmitting the estimated optimized length of the CP sample through the transmitter.

5. The method of claim 4, wherein in (ii), the MSB data of the respective first samples and the MSB data of the respective second samples are compared to calculate correlation statuses.

6. The method of claim 5, wherein +1 is added to the correlation status when the respective compared MSB data are the same, and −1 is added to the correlation status when the respective compared MSB data are different.

7. The method of claim 4, wherein the move quantity in (iii) is greater than 1, and it doubles at the time of repetition.

8. In a VDSL (Very high bit-rate Digital Subscriber Line) system on the basis of the DMT (Discrete MultiTone) line coding method, the VDSL system including a transmitter for transmitting data including a CP (cyclic prefix) sample through a channel; a receiver for receiving the data including the CP sample through the channel; a controller for controlling the transmitter and the receiver to control initial operations and a data transmission operation; and a CP sample length estimator for estimating an optimized length of the CP sample on the basis of the correlation status of the data received through the channel, a method for determining a CP sample length in the VDSL system on the DMT line coding method basis comprising:

(a) the controller transmitting the maximum length of the CP sample through the transmitter;
(b) the CP sample length estimator receiving data including the CP of the transmitted maximum length through the receiver;
(c) the CP sample length estimator estimating the optimized length of the CP sample on the basis of a correlation status between the CP sample included in the received data and symbol, and transmitting the estimated optimized length to the controller; wherein (c) comprises:
  (i) storing the CP samples included in the received data;
  (ii) repeating a calculating operation of the correlation status between a predetermined number of first samples from among the stored CP sample and second samples matched with the first samples from among data from which the CP sample is excluded by moving the first and second samples by a predetermined move quantity, and concurrently calculating the correlation status on a portion where the first and second samples are superimposed through a pipeline operation in each repetition step, the portion being moved by the move quantity;
  (iii) determining whether the correlation statuses respectively calculated in (ii) are matched with a predetermined threshold value; and
  (iv) estimating the addition of the move quantity matched with the predetermined correlation status and the predetermined number as the optimized length of the CP sample, when the predetermined correlation status is matched with the predetermined threshold value in (iii); and
(d) the controller transmitting the estimated optimized length of the CP sample through the transmitter.

9. The method of claim 8, wherein in (ii), the MSB data of the respective first samples and the MSB data of the respective second samples are compared to calculate correlation statuses.

10. The method of claim 9, wherein +1 is added to the correlation status when the respective compared MSB data are the same, and −1 is added to the correlation status when the respective compared MSB data are different.

11. The method of claim 8, wherein the move quantity in (ii) is greater than 1, and it doubles at the time of repetition.

12. In a VDSL (Very high bit-rate Digital Subscriber Line) system on the basis of the DMT (Discrete MultiTone) line coding method, the VDSL system including a transmitter for transmitting data including a CP (cyclic prefix) sample through a channel; a receiver for receiving the data including the CP sample through the channel; a controller for controlling the transmitter and the receiver to control initial operations and a data transmission operation; and a CP sample length estimator for estimating an optimized length of the CP sample on the basis of the correlation status of the data received through the channel, a method for determining a CP sample length in the VDSL system on the DMT line coding method basis comprising:

(a) the controller transmitting the maximum length of the CP sample through the transmitter;
(b) the CP sample length estimator receiving data including the CP of the transmitted maximum length through the receiver;
(c) the CP sample length estimator estimating the optimized length of the CP sample on the basis of a correlation status between the CP sample included in the received data and symbol, and transmitting the estimated optimized length to the controller;
a counter for starting counting at the time of receiving data, and (c) comprising:
  (i) operating the counter to start counting;
  (ii) determining whether a counting value of the counter is greater than a predetermined move quantity and if the counting value is concurrently less than the addition of the predetermined move quantity and a number of predetermined samples;
  (iii) storing the MSB data of the received data matched with the counting value, when the counting value is greater than the predetermined move quantity and it is concurrently less than the addition of the predetermined move quantity and the number of predetermined samples in (ii);
  (iv) determining whether the counting value is greater than the addition of the predetermined move quantity and the length of data obtained by subtracting the CP sample from the received data, and if it is concurrently less than the addition of the predetermined move quantity, the length of the data obtained by subtracting the CP sample from the received data, and the number of the predetermined samples;
  (v) respectively comparing the MSB data of the received data matched with the counting value with the MSB data stored in (iii), and calculating a correlation status, when the counting value is greater than the addition of the predetermined move quantity and the length of data obtained by subtracting the CP sample from the received data, and it is concurrently less than the addition of the predetermined move quantity, the length of the data obtained by subtracting the CP sample from the received data, and the number of the predetermined samples in (iv);
  (vi) determining whether the calculated correlation status is matched with the predetermined threshold value;
  (vii) controlling the predetermined move quantity and repeating (i) through (vi), when the calculated correlation status is different from the predetermined threshold value in (vi); and
  (viii) estimating the addition of the predetermined move quantity and the predetermined number as an optimized length of the CP, when the calculated correlation status is matched with the predetermined threshold value in (vi); and
(d) the controller transmitting the estimated optimized length of the CP sample through the transmitter.

* * * * *